No. 742,313. PATENTED OCT. 27, 1903.
W. HAGSPIEL.
DEVICE FOR DRESSING VALVE SEATS.
APPLICATION FILED JUNE 7, 1902.
NO MODEL. 2 SHEETS—SHEET 2.

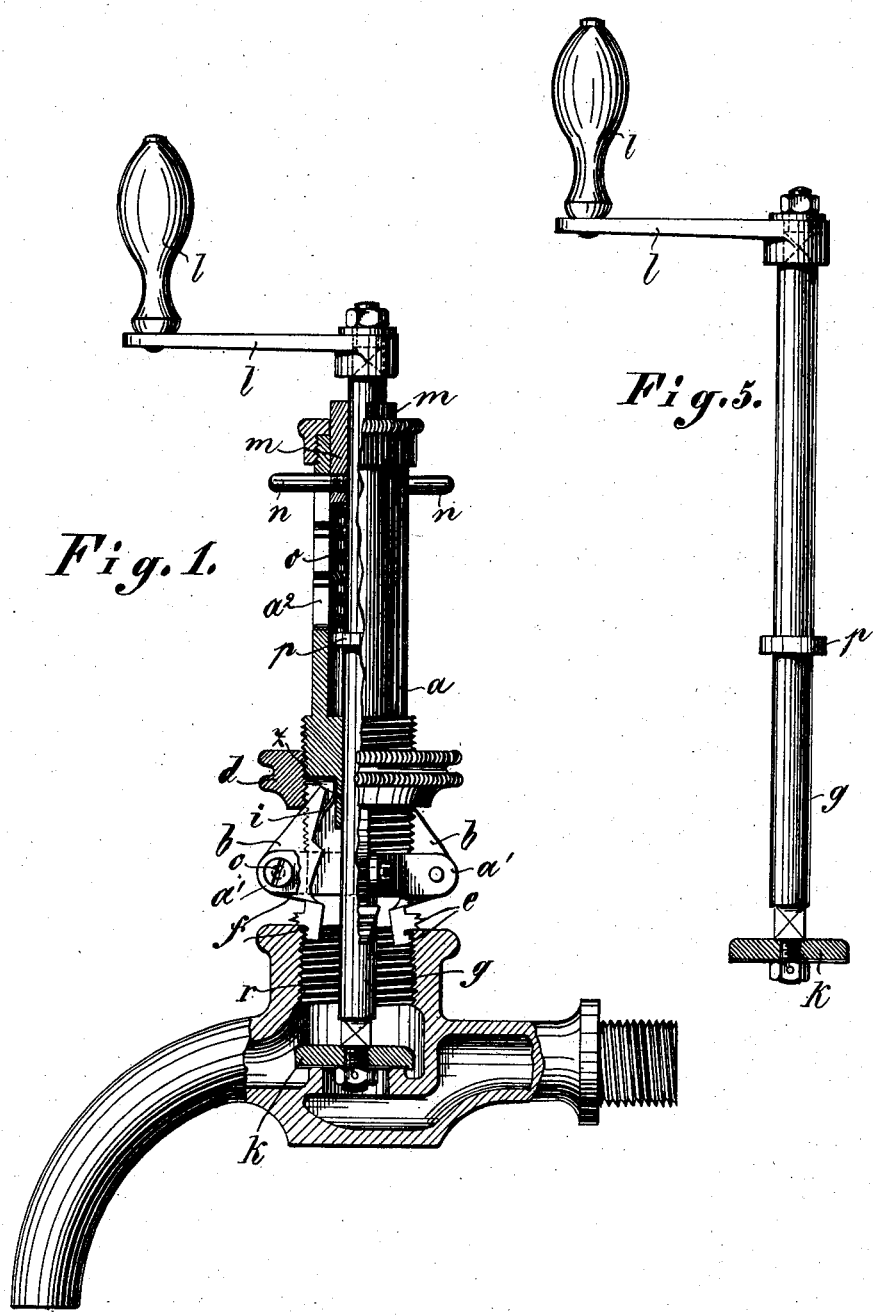

Witnesses:

Inventor
Wilhelm Hagspiel
By James L. Norris
Atty.

No. 742,313. Patented October 27, 1903.

UNITED STATES PATENT OFFICE.

WILHELM HAGSPIEL, OF LUDWIGSBURG, GERMANY, ASSIGNOR TO APPARATEBAUANSTALT LUDWIGSBURG G. M. B. H., OF LUDWIGSBURG, GERMANY.

DEVICE FOR DRESSING VALVE-SEATS.

SPECIFICATION forming part of Letters Patent No. 742,313, dated October 27, 1903.

Application filed June 7, 1902. Serial No. 110,662. (No model.)

*To all whom it may concern:*

Be it known that I, WILHELM HAGSPIEL, a subject of the Emperor of Germany, residing at Ludwigsburg, Kingdom of Würtemberg, in the Empire of Germany, have invented a new and useful Tool for Reseating Valves, of which the following is a specification.

My invention relates to improvements in devices for cutting or milling valve-seats having expanding jaws for engaging the internal surface of the valve-casing and for centering the device; and the objects of my improvements are, first, to provide the expanding jaws with one or several sets of acute teeth; second, to provide a spring or springs for automatically returning the jaws to their initial positions; third, to provide a separate support for the spring or springs for the purpose of preventing them from falling off; fourth, to provide arms by means of which the device may be firmly secured to flanged valve-casings not provided with screw-threads; fifth, to provide a spring for pressing the operating-spindle in the longitudinal direction; sixth, to provide means for the adjustment of the operating-spindle in the longitudinal direction; seventh, to so construct the operating-spindle as to render it reversible, so that it may suit different depths of valve-seats, and, eighth, to provide a grinding-holder furnished with adjustable means for clamping the valve-stem, this holder being adapted to be secured to the operating-spindle in place of the cutting or milling tool for the purpose of grinding the valve proper upon its seat.

In order to prevent any damage to the screw-threads of the valve-casing in applying my device thereto, I provide the expanding jaws of my device with the sets of acute teeth hereinafter described. The acute teeth of each set correspond with a screw-thread of average diameter and pitch and engage in the screw-thread of the valve-casing, so that any damage to the thread by the expanding jaw is avoided.

For flanged valve-casings having no internal screw-threads, but smooth walls, my device may be still used by means of its arms named above, while the expanding jaws serve for centering the device.

The device is illustrated in the accompanying drawings, in which—

Figure 4:
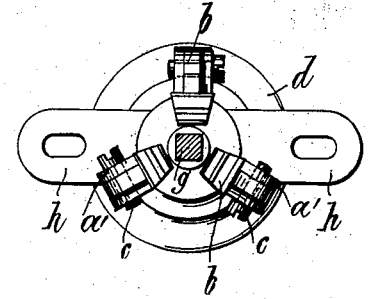
Figure 2:
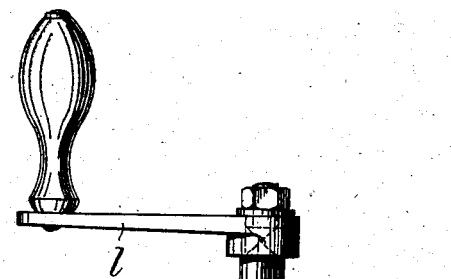
Figure 3:
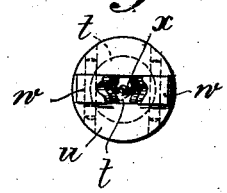

Figure 1 is an elevation, partly in section, of the device applied to a valve-casing with an internal screw-thread and arranged for cutting or milling the valve-seat. Fig. 2 is an elevation of the device applied to a flanged valve-casing and arranged for grinding the valve upon its seat. Fig. 3 is an end view of the valve-stem gripper. Fig. 4 is a cross-section of the device on the line 1 2 in Fig. 2, and Fig. 5 is an elevation of the operating-spindle with the handle and a cutting or milling tool.

Similar letters of reference refer to similar parts throughout the several views.

The casing $a$ is provided at its lower end with three pairs of ears $a'$ and three grooves for the expanding jaws $b$; further, with two transverse arms $h\ h$, (which in Fig. 1 are omitted,) and, finally, with a threaded part, on which the nut $d$ is arranged in a known manner to be screwed up or down, as required. The expanding jaws $b$ are pivoted on screws $c$. On the upper oblique parts of these jaws the nut $d$ bears when screwed down, and thereby moves the expanding jaws radially outward until they press against the internal surface of the valve-casing bore. The lower part of each jaw $b$ is in this instance furnished with two sets of very acute teeth $e$ of peculiar shape, which correspond in pitch with different screw-threads of average diameter and pitch, and when the device is applied to a valve having an internal screw-thread (see Fig. 1) these teeth $e$ engage in the screw-thread $r$ of the same. Of course the expanding jaws $b$ may have more than two sets of acute teeth, according to the diameters of the valve-casings to which the device is to be adapted. By pivotally connecting the jaws with the casing and making the thread-engaging teeth very acute the tool is rendered thoroughly operative in cases where if the jaws had merely a lateral movement the teeth could not enter the grooves of the screw-thread, but would impinge the crests thereof and tend to mutilate them. Thus in the event that the tool is used on a valve-casing having threads of different pitch than either of those of the sets of teeth on the jaws no danger of injuring the valve-threads will ensue, inasmuch as the pivotal arrangement of the jaws will permit the teeth to seat themselves between the valve-threads, and the greater acuteness of the teeth as compared with the valve-threads will allow the crests or points of the teeth firmly to impinge the wall of the threads, and thus hold the tool in operative position.

When the apparatus is inserted, the plane surfaces $f$ between the uppermost teeth $e$ and the expanding jaws and between the different teeth rest on the turned upper part of the valve casing or body, and so insure the true vertical adjustment of the device. Springs $i$ are provided for automatically returning the expanding jaws $b$ to their initial position on the nut $d$ being loosened, so as to protect the internal screw-thread of the valve-casing against damage.

In the case of flanged valve-casings the device is held steady by means of the transverse arms $h$, which are secured to the valve-flange by screws, as shown in Fig. 2. In this case the teeth $e$ of the expanding jaws $b$ rest on the smooth bore $s$ of the valve-casing and insure the exact central adjustment of the device.

In order to adapt the pressure of the cutting or milling tool or of the valve proper to the hardness of the material to be cut or ground, respectively, the operating-spindle is subjected to the pressure of a spring. For this purpose the operating-spindle $g$ is adapted not only to turn, but also to slide longitudinally in the casing $a$. It is provided with a collar $p$, against which a spiral spring $o$, surrounding the spindle, is made to bear. The other end of this spring bears against a sleeve $m$, which is introduced into the casing $a$, and provided with handles $n$ for limiting its outward movement. Under the action of this spring $o$ the operating-spindle $g$ is pressed downward, so that the milling-tool $k$, Figs. 1 and 5, attached to its lower end, is enabled to perform its duty, or the valve itself may be ground properly upon its seat, Fig. 2, when the spindle $g$ is turned by its handle $l$, secured to its upper end.

The device is adapted to the grinding of the valve proper upon its seat by substituting for the milling or cutting tool $k$ a holder or gripper for carrying the valve. This holder or gripper is constructed as follows: A piece or stud $t$ is screw-threaded internally and externally and formed with a conical end. This piece or stud $t$ is mounted on the screw-threaded portion of the operating-spindle $g$ after the removal of the cutter $k$. Upon the external thread of the said piece or stud $t$ is screwed a ring $u$, which carries in suitable recesses pivoted gripping-jaws $w$, adapted to firmly clamp the valve-stem $y$. These jaws, of which there may be two or more, are normally kept extended or spread apart by a spring $x$.

For tightening the gripping-jaws $w$ upon the valve-stem $y$ it is only necessary to screw the ring $u$ farther on the piece or stud $t$, thereby causing the tails of the jaws $w$ to travel along the coned end of the said piece or stud, and so press the outer ends of the jaws firmly against the valve-stem $y$ and retain it. The form of the outer ends of said jaws is such as to be capable of engaging valve-stems of various sizes.

For adjusting the device to various depths of valve-seats the casing $a$ is provided with two longitudinal slots $a^2$ on opposite sides, having a number of notches $q$ opening out of said slots. By this means the handles $n$ of the sleeve $m$ can be adjusted to different heights and the tension of the spiral spring $o$ can be regulated. This adjustability of the spindle-pressure is of special advantage.

To obtain a greater facility and a wider range for this longitudinal adjustment of the operating-spindle $g$, the collar $p$ of the latter is not arranged centrally, but is so disposed as to divide the spindle into two portions of unequal lengths, and, moreover, the spindle $g$ is made reversible. Then, according to the position or depth of the valve-seat in the interior of the valve-casing, the cutting or milling tool $k$ or the holder for the valve-stem can be attached to either the longer or the shorter portion of the spindle $g$ and the operating-handle $l$ to the opposite end thereof.

In order to prevent the springs $i$ of the toothed jaws $b$ from falling out of their recesses when removing the spindle $g$, it is necessary to keep said springs apart from the latter. To this end I provide an extension or neck $z$ on the lower end of the casing $a$ to receive and support the spring or springs $i$. I may, however, provide a separate sleeve, ring, or the like for the purpose.

What I claim as my invention, and desire to secure by Letters Patent, is—

1. A tool of the class described having pivoted gripping-jaws, each provided with a plurality of very acute teeth of different pitch, thereby to adapt the tool for use in connection with screw-threads having different pitches from those of the teeth.

2. In a milling device, a casing, a spindle in said casing, both ends of said spindle being alike, adapting it to be reversed, a collar on said spindle, located away from the longitudinal middle thereof, a spring bearing at one end against said collar and at the other end against a portion of said casing, a milling-tool removably attached to one end of said spindle, and operating means for said spindle removably attached to the opposite end of said spindle.

In witness whereof I have hereunto set my hand in presence of two witnesses.

WILHELM HAGSPIEL.

Witnesses:
WM. HAHN,
ERNST ENTENMAN.